United States Patent [19]
Ikemachi et al.

[11] Patent Number: 6,071,644
[45] Date of Patent: *Jun. 6, 2000

[54] METAL HYDRIDE STORAGE CELL AND METHOD OF PRODUCING HYDROGEN ABSORBING ALLOY ELECTRODE

[75] Inventors: Takaaki Ikemachi; Takashi Yamaguchi, both of Hyogo; Hideki Okajima, Tokushima; Shigeto Tamezane, Hyogo, all of Japan

[73] Assignee: Sanyo Electric Co., Ltd., Moriguchi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/941,489

[22] Filed: Oct. 1, 1997

[30] Foreign Application Priority Data

Sep. 30, 1996 [JP] Japan .................................. 8-259652
Nov. 20, 1996 [JP] Japan .................................. 8-309648

[51] Int. Cl.$^7$ .............................. H01M 4/58; H01M 6/00; C01B 6/24
[52] U.S. Cl. ........................ 429/218.2; 29/623.5; 420/900
[58] Field of Search ................................ 429/218.2, 123; 29/623.5; 420/900; 427/123

[56] References Cited

U.S. PATENT DOCUMENTS

| | | | |
|---|---|---|---|
| 4,946,646 | 8/1990 | Gamo et al. | 420/415 |
| 5,389,468 | 2/1995 | Fujiwara et al. | 429/206 |
| 5,506,070 | 4/1996 | Mori et al. | 429/59 |
| 5,518,509 | 5/1996 | Tadokoro et al. . | |
| 5,605,585 | 2/1997 | Yamamoto et al. | 148/513 |
| 5,690,799 | 11/1997 | Tsukahara et al. | 204/293 |

FOREIGN PATENT DOCUMENTS

| | | |
|---|---|---|
| 1-130467 | 5/1989 | Japan . |
| 5-62676 | 3/1993 | Japan . |
| 5-258750 | 10/1993 | Japan . |

*Primary Examiner*—Maria Nuzzolillo
*Assistant Examiner*—Tracy Dove
*Attorney, Agent, or Firm*—Armstrong, Westerman, Hattori, McLeland & Naughton

[57] ABSTRACT

The present invention aims to provide a method of producing a hydrogen absorbing alloy electrode which is solid and enables a metal hydride storage cell, using the hydrogen absorbing alloy electrode, with high discharge characteristics in high-rate discharge and in low temperature and a long cycle life. To achieve this, the hydrogen absorbing alloy electrode is produced by firstly generating a first powder by giving a surface treatment to a hydrogen absorbing alloy powder in an acid solution, secondly generating a mixed material by mixing the first powder with a second powder which is composed of a metal which does not absorb hydrogen and/or an alloy which does not absorb hydrogen, thirdly attaching the mixed material to a base plate, and fourthly baking the base plate for sintering the mixed material attached to the base plate. The hydrogen absorbing alloy electrode may also be produced by firstly generating a first powder by attaching a nickel-rich metal to the surface of a hydrogen absorbing alloy powder, secondly generating a mixed material by mixing the first powder with a second powder which is composed of a metal which does not absorb hydrogen and/or an alloy which does not absorb hydrogen, thirdly attaching the mixed material to a base plate, and fourthly baking the base plate for sintering the mixed material attached to the base plate.

8 Claims, 7 Drawing Sheets

TABLE 1

| ELECTRODE | SURFACE TREATMENT | Ni POWDER | BAKING TEMPERATURE (°C) | NUMBER OF SEPARATED SQUARES | SINGLE ELECTRODE CAPACITY(%) |
|---|---|---|---|---|---|
| S1 | ACID TREATMENT | INCLUDED | 700 | 23 | 100 |
| E1 | ACID TREATMENT | INCLUDED | — | 17 | 101.0 |
| E2 | ALKALI TREATMENT | INCLUDED | 700 | 53 | 93.5 |
| E3 | — | INCLUDED | 700 | 48 | 99.5 |
| E4 | ACID TREATMENT | — | 700 | — | — |
| E5 | ACID TREATMENT | — | 1000 | 72 | 64.8 |

TABLE 2

| CELL | DISCHARGE CAPACITY (mAh) (HIGH-RATE DISCHARGE) | DISCHARGE CAPACITY (mAh) (LOW TEMPERATURE) |
|---|---|---|
| A1 | 936 | 878 |
| X1 | 919 | 809 |

TABLE 3

| DISCHARGE CURRENT (CA) | CELL $A_2$ (mAh) | CELL $A_3$ (mAh) | CELL $X_6$ (mAh) | CELL $X_7$ (mAh) |
|---|---|---|---|---|
| 0.2 | 2400 | 2400 | 2380 | 2400 |
| 1 | 2390 | 2390 | 2360 | 2320 |
| 2 | 2370 | 2370 | 2340 | 2110 |
| 4 | 2260 | 2250 | 2000 | 800 |
| 8 | 2190 | 2170 | 1500 | 0 |

METAL HYDRIDE STORAGE CELL AND METHOD OF PRODUCING HYDROGEN ABSORBING ALLOY ELECTRODE

BACKGROUND OF THE INVENTION (1) Field of the Invention

The present invention relates to a metal hydride storage cell and a method of producing a hydrogen absorbing alloy electrode using a hydrogen absorbing alloy which electrochemically absorbs and releases hydrogen. The present invention specifically relates to an improved method of producing a sintered hydrogen absorbing alloy electrode.

(2) Related Art

As technologies in the electronics field have developed in a rapid pace, portable or cordless electronic devices have been brought into markets. There are increasing demands for compact, light secondary cells having high energy density and high performance efficiency for use in such electronic devices as the power source.

Under such circumstances, metal hydride storage cells including a hydrogen absorbing alloy negative electrode are drawing attention. This is because such metal hydride storage cells are able to have higher energy density than nickel-cadmium storage cells or lead storage cells, and therefore, are suitable for high-capacity cells. Moreover, they are clean power sources.

In the metal hydride storage cells, oxygen gas is generated from the positive electrode when the positive electrode is overcharged. Therefore, a capacity greater than that of the positive electrode is set as the capacity of the negative electrode so that the generated oxygen gas is consumed in the negative electrode.

Hydrogen absorbing alloy electrodes are generally produced as follows.

First, a slurry is made by mixing hydrogen absorbing alloy powder with an organic binding agent and water. Then, the slurry is applied onto or filled into a core plate and is then dried. As the hydrogen absorbing alloy, a rare-earth-nickel alloy, a magnesium-nickel alloy, or a titan-nickel alloy is used.

However, hydrogen absorbing alloy electrodes produced with the above method tend to have low electronic conduction and show poor charge/discharge characteristics in high-rate charge/discharge and in low temperature since the binding agent is included in between the hydrogen absorbing alloy powders.

The hydrogen absorbing alloy electrodes produced with the above method also have a problem that the hydrogen absorbing alloy is gradually oxidized and the capacity of the negative electrode is reduced as the negative electrode consumes the oxygen gas generated in the positive electrode due to an overcharge. This shortens the period of charge/discharge cycles.

To solve the above problems, a method has been proposed in which a non-sintered electrode is changed to a sintered electrode.

For example, Japanese Laid-Open Patent Application No.5-258750 discloses a method in which a hydrogen absorbing alloy electrode is produced by baking a hydrogen absorbing alloy powder with nickel attached to its surface for a short period at 400–1000° C. for sintering. With this method, a nickel-rich alloy layer is formed on the surface of the hydrogen absorbing alloy. This increases the catalysis efficiency of the surface without increasing the hydrogen equilibrium pressure of the hydrogen absorbing alloy, and improves the electrochemical hydrogen absorption speed and the charge/discharge efficiency in charging/discharging.

However, the electrode produced with the above method does not have enough strength to securely retain the hydrogen absorbing alloy around the core plate. As a result, the hydrogen absorbing alloy often separates from the core plate during cell construction.

The separation between the hydrogen absorbing alloy and the core plate may be prevented by adding a binding agent after the electrode is sintered. In this case, however, the added binding agent often disturbs electrochemical reaction.

Japanese Laid-Open Patent Application No.1-130467 discloses a method in which a hydrogen absorbing alloy powder is given an acid treatment or an alkali treatment so that a nickel-rich layer, which, as a catalyst, reduces oxygen, is formed on the surface of the hydrogen absorbing alloy powder. An electrode plate is then formed by using this hydrogen absorbing alloy powder. The electrode plate is baked to be sintered to increase the electronic conductivity of the electrode plate, and to improve charge/discharge characteristics in high-rate charge/discharge and in low temperature.

However, it is required in this method to bake the electrode plate at a high temperature of 1000° C. for sintering. Furthermore, this method has the same problem as the earlier method. That is, the electrode produced with the above method does not have enough strength to securely retain the hydrogen absorbing alloy around the core plate. As a result, the hydrogen absorbing alloy often separates from the core plate during cell construction.

Japanese Laid-Open Patent Application No.5-62676 discloses a method in which a micro powder of Ni or Co is added as a sintering auxiliary material to a mixture of an $MmNi_5$ hydrogen absorbing alloy powder and an $Mg_2Ni$ hydrogen absorbing alloy powder. An electrode plate is formed by using this mixed powder. The electrode plate is then baked to be sintered to increase the electronic conductivity of the electrode plate, and to improve charge/discharge characteristics in high-rate charge/discharge and in low temperature.

However, the metal hydride storage cell produced with the above method has problems that a corrosion of the hydrogen absorbing alloy tends to grow fast and that the cycle life is short.

The above application document also discloses that a hydrogen absorbing alloy powder whose surface has been given an alkali treatment may also be used in the method, providing the same effect. However, when a hydrogen absorbing alloy powder is given an alkali treatment, a hydroxide is formed on the surface of the powder. The hydroxide decomposes when the hydrogen absorbing alloy powder is baked for sintering. This causes the hydrogen absorbing alloy powder to be oxidized, which tends to reduce the capacity of the hydrogen absorbing alloy electrode.

SUMMARY OF THE INVENTION

It is therefore an object of the present invention to provide a method of producing a hydrogen absorbing alloy electrode which is solid and enables a metal hydride storage cell, using the hydrogen absorbing alloy electrode, with high discharge characteristics in high-rate discharge and in low temperature and a long cycle life.

The above object is achieved by producing a hydrogen absorbing alloy electrode by firstly generating a first powder by giving surface treatment to a hydrogen absorbing alloy powder in an acid solution, secondly generating a mixed material by mixing the first powder with a second powder which is composed of a metal which does not absorb hydrogen and/or an alloy which does not absorb hydrogen, thirdly attaching the mixed material to a base plate, and fourthly baking the base plate for sintering the mixed material attached to the base plate.

The above object is also achieved by producing a hydrogen absorbing alloy electrode by firstly generating a first powder by attaching a nickel-rich metal to the surface of a hydrogen absorbing alloy powder, secondly generating a mixed material by mixing the first powder with a second powder which is composed of a metal which does not absorb hydrogen and/or an alloy which does not absorb hydrogen, thirdly attaching the mixed material to a base plate, and fourthly baking the base plate for sintering the mixed material attached to the base plate.

A nickel-rich layer is formed on the surface of the hydrogen absorbing alloy powder when the hydrogen absorbing alloy powder is given the surface treatment in the acid solution. Therefore, a nickel-rich layer is formed on the surface of the hydrogen absorbing alloy powder by either of the above methods.

The nickel-rich layer formed on the surface of the hydrogen absorbing alloy negative electrode prevents the negative electrode from being oxidized when the negative electrode consumes the oxygen gas generated in the positive electrode due to overcharge. That is, the nickel-rich layer prevents the reduction in the negative electrode capacity while the metal hydride storage cell repeats a charge/discharge cycle. This improves the charge/discharge cycle life.

The nickel-rich layer also prevents the hydrogen absorbing alloy from being poisoned by carbon in a binding agent when the electrode is baked for sintering.

The nickel-rich layer formed by the above surface treatment in the acid solution or by attaching a nickel-rich metal to the surface of the hydrogen absorbing alloy powder is not disturbed by the trouble caused by the alkali treatment as described above, that is, the alloy is oxidized when the electrode is baked for sintering. Especially, the nickel-rich layer is free of the problem that hydroxides of rare earth or oxides of rare earth, which disturb cell reaction, are generated.

The nickel-rich layer also intensifies the solidity of a conductive network which is formed in the negative electrode by the second powder in the mixed material when the hydrogen absorbing alloy electrode is baked for sintering since the nickel-rich layer promotes the sintering.

The intensified conductive network contributes to improvement in the solidity and conductivity of the metal hydride storage cell.

To form a steady conductive network, it is desirable to use, as the second powder, one of a metal Ni, a metal Co, an alloy containing Ni, and an alloy containing Co.

Conventionally, argon gas or the like has been used when a Mischmetal hydrogen absorbing alloy is baked since, when baked in an atmosphere of nitrogen gas, the gas and a rare earth compound in the alloy form a nitride which damages the hydrogen absorbing alloy. However, the above nickel-rich layer enables the use of the nitrogen gas in the above sintering process since the nickel-rich layer works as a protective layer against the formation of the nitride. This makes the sintering process cost-effective since the nitrogen gas is relatively inexpensive.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

<Embodiment 1>

Figure 1:
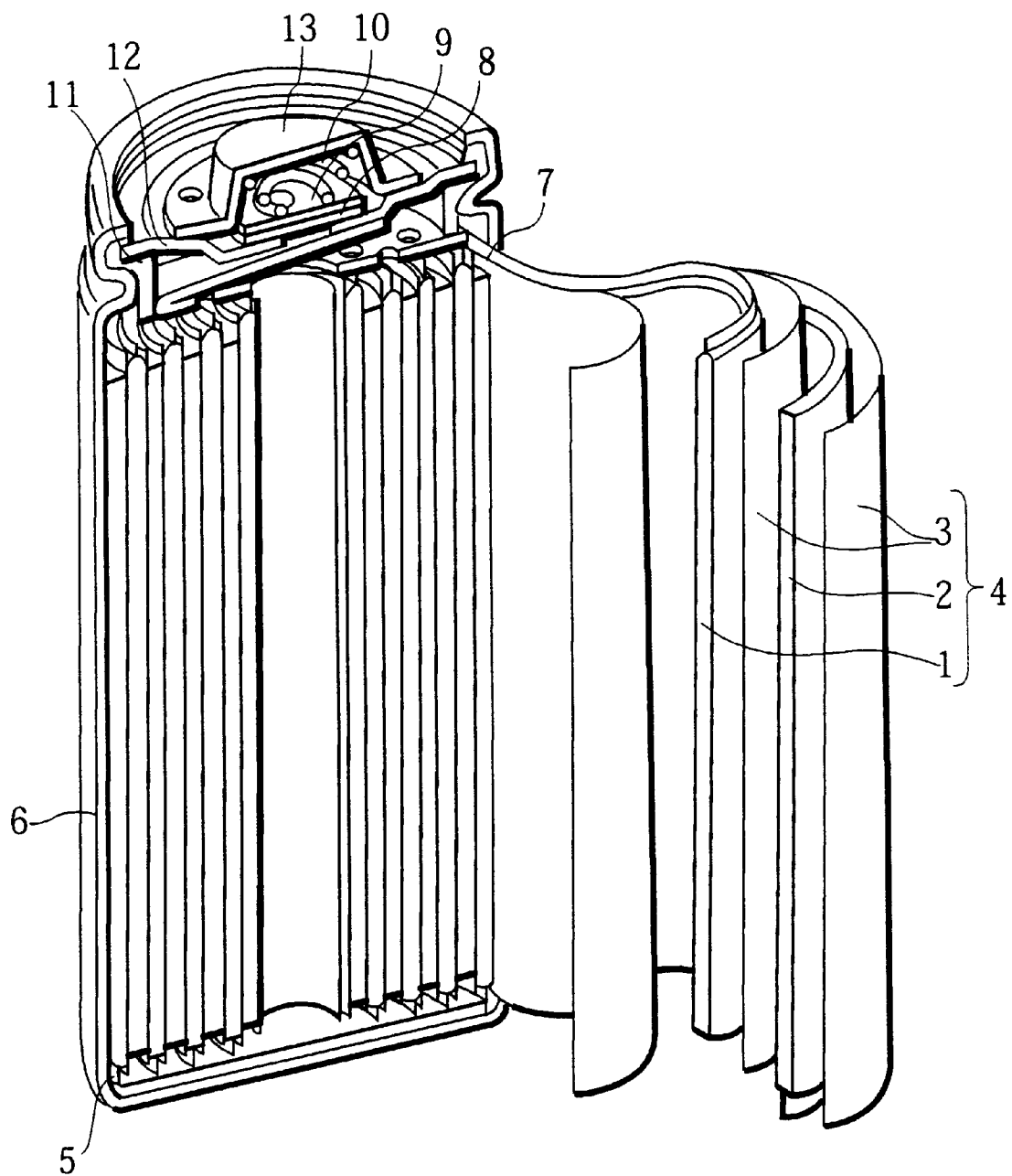
FIG.1 is a perspective illustration of the metal hydride storage cell of Embodiment 1.

FIG.1 is a perspective illustration of the metal hydride storage cell of Embodiment 1.

As shown in the drawing, in the storage cell, electrode group 4, which is composed of sintered nickel positive electrode plate 1 and hydrogen absorbing alloy negative electrode plate 2 with separator 3 in between, is housed in cell case 6 with alkali electrolyte, and seal plate 12 is attached to gasket 11 which is formed at the opening of cell case 6.

Positive electrode terminal 13 is attached to seal plate 12. Positive electrode plate 1 is electrically connected to positive electrode terminal 13. Negative electrode plate 2 is electrically connected to cell case 6 via negative current collecting unit 5.

Valve plate 8, pressure plate 9, and coil spring 10 are attached to seal plate 12. With this construction, when the internal pressure of the cell increases, pressure plate 9 is pressed and internal gas is released.

A method of producing the above metal hydride storage cell is described below.

Producing Negative Electrode Plate

Certain amounts of Mischmetal (Mm: a mixture of rare earth elements), nickel, cobalt, manganese, and aluminum measured by a balance are mixed together. The mixture is melted in an atmosphere of inactive gas then cooled, resulting in an ingot of hydrogen absorbing alloy.

The ingot of hydrogen absorbing alloy is annealed in inactive gas then ground by a grinding machine in an atmosphere of inactive gas, resulting in a Mischmetal hydrogen absorbing alloy powder.

The hydrogen absorbing alloy powder is given an acid treatment in which the hydrogen absorbing alloy powder is immersed in hydrochloric acid solution, is washed enough with ion-exchanged water, and is dried.

With the above acid treatment, a nickel-rich layer is formed on the surface of the hydrogen absorbing alloy powder.

A metal powder or an alloy powder which does not absorb hydrogen is added to the hydrogen absorbing alloy powder having been through the acid treatment. This hydrogen absorbing alloy powder is further mixed with an organic binding agent and a solvent, resulting in a slurry.

The metal or alloy which does not absorb hydrogen is, for example, Ni powder, Co powder, alloy powder containing Co, etc. Among these, it is desirable to use Ni powder.

As the organic binding agent, polytetrafluoroethylene, poly ethylene oxide or the like may be used.

The slurry made of mixed materials as described above is applied onto both sides of a current collecting unit made of a metal holed core plate, and the current collecting unit is rolled, resulting in a non-sintered hydrogen absorbing alloy electrode.

As the metal holed core plate, punching metal, expanded metal, nickel sponge or the like may be used.

A sintered hydrogen absorbing alloy electrode is generated by baking the non-sintered hydrogen absorbing alloy electrode for sintering in an atmosphere of inactive gas. Argon gas may be used as inactive gas. Using nitrogen gas is cost effective. The non-sintered hydrogen absorbing alloy electrode may be baked at a relatively low temperature of about 700° C. for sintering when Ni powder has been added.

As a result of baking the nickel-rich layer and Ni powder on the surface of the hydrogen absorbing alloy for sintering, a steadily conductive network is formed in the negative electrode.

Producing Cell

The sintered hydrogen absorbing alloy electrode produced as above and the sintered nickel electrode produced with a known method are together wound with the separator made of unwoven cloth in between, resulting in as electrode group.

The metal hydride storage cell is produced by inserting the electrode group into the cell case, injecting alkali electrolyte into the cell case, and sealing the cell case.

The metal hydride storage cell produced as above has the following advantage: the nickel-rich layer formed through the acid treatment on the surface of the hydrogen absorbing alloy negative electrode prevents the negative electrode from being oxidized when the negative electrode consumes the oxygen gas generated in the positive electrode due to overcharge.

Also in the above metal hydride storage cell, the hydrogen absorbing alloy is securely held around the core plate of the negative electrode and is hardly separated from it since a steadily conductive network is formed in the negative electrode.

Accordingly, the metal hydride storage cell includes a solid negative electrode plate, shows superior charge/discharge characteristics in high-rate charge/discharge and in low temperature, and has a long cycle life.

<Sample 1>

A sample hydrogen absorbing alloy electrode and a sample metal hydride storage cell were produced based on Embodiment 1.

Certain amounts of Mischnickel, nickel, cobalt, manganese, and aluminum measured by a balance so that their element ratio becomes 1:3.4:0.8:0.6:0.2 were mixed together. The mixture of these materials was melted in a high frequency melting furnace in an atmosphere of argon gas and was cooled, resulting in an ingot of hydrogen absorbing alloy represented by composition formula $Mn_{1.0}Ni_{3.4}Co_{0.8}Mn_{0.6}Al_{0.2}$.

The ingot of hydrogen absorbing alloy was annealed for 8 hours at 1000° C. The ingot was then ground by a grinding machine until the mean grain size became 150 $\mu$m.

The hydrogen absorbing alloy powder having resulted from the above process was given an acid treatment in which the hydrogen absorbing alloy powder was immersed in hydrochloric acid solution of pH=1 for 20 minutes.

A slurry was made by mixing a mixture of 90% by weight of hydrogen absorbing alloy powder and 10% by weight of metal Ni powder with 1% by weight of poly ethylene oxide powder as the binding agent and pure water as the solvent, where the 90% by weight of hydrogen absorbing alloy powder had been through an acid treatment.

The slurry was applied onto both sides of punching metal. The slurry was then dried, and baked for three hours at 700° C. for sintering.

The sintered hydrogen absorbing alloy electrode produced as above is called electrode S1.

A metal hydride storage cell on theoretical capacity 1000 mAh was produced using electrode S1 as the negative electrode and also using 30% by weight of potassium hydroxide solution as the alkali electrolyte. The metal hydride storage cell is called cell A1.

<Comparative Sample 1>

A non-sintered hydrogen absorbing alloy electrode was produced with the same production method as Sample 1 except that the electrode was not sintered. The non-sintered hydrogen absorbing alloy electrode is called electrode E1.

A metal hydride storage cell was produced using electrode E1, in the same way as cell A1. The metal hydride storage cell is called cell X1.

<Comparative Sample 2>

A sintered hydrogen absorbing alloy electrode was produced with the same production method as Sample 1 except the following: the hydrogen absorbing alloy was given an alkali treatment instead of the hydrochloric acid solution treatment, that is, the hydrogen absorbing alloy was immersed in potassium hydroxide solution (liquid temperature 80° C.) of pH=14 for one hour. The sintered hydrogen absorbing alloy electrode is called electrode E2.

A metal hydride storage cell was produced using electrode E2, in the same way as cell Al. The metal hydride storage cell is called cell X2.

<Comparative Sample 3>

A sintered hydrogen absorbing alloy electrode was produced with the same production method as Sample 1 except that the hydrogen absorbing alloy was not given the hydrochloric acid solution treatment. The sintered hydrogen absorbing alloy electrode is called electrode E3.

A metal hydride storage cell was produced using electrode E3, in the same way as cell A1. The metal hydride storage cell is called cell X3.

<Comparative Sample 4>

A sintered hydrogen absorbing alloy electrode was produced with the same production method as Sample 1 except the following: the slurry was made by mixing 100% by weight of hydrogen absorbing alloy powder having been through the hydrochloric acid solution treatment, 1% by weight of poly ethylene oxide powder, and pure water, without adding metal Ni. The sintered hydrogen absorbing alloy electrode is called electrode E4.

A metal hydride storage cell was produced using electrode E4, in the same way as cell A1. The metal hydride storage cell is called cell X4.

<Comparative Sample 5>

A sintered hydrogen absorbing alloy electrode was produced with the same production method as Sample 1 except the following: the slurry was made by mixing 100% by weight of hydrogen absorbing alloy powder haven been through the hydrochloric acid solution treatment, 1% by weight of poly ethylene oxide powder, and pure water, without adding metal Ni; and the sintering temperature was 1000° C. The sintered hydrogen absorbing alloy electrode is called electrode E5.

A metal hydride storage cell was produced using electrode E5, in the same way as cell A1. The metal hydride storage cell is called cell X5.

Table 1 shows characteristics of the above hydrogen absorbing alloy electrodes in Sample 1 and Comparative Samples 1–5.

<Experiment>

The following experiments 1–4 were performed using the electrodes and the cells in Sample 1 and Comparative Samples 1–5.

<Experiment 1>
Measuring Binding Strength of Active Material

First, 22 lines were drawn at around the center of each of electrodes S1 and E1–E5 by a cutter so that 11 parallel lines out of the 22 lines are perpendicular to the other 11 parallel lines, with 1 mm distance between the lines. As a result of this cutting, 100 squares were made in a 1-cm$^2$ square.

Each electrode was then dropped three times from the same height to obtain the number of squares among the 100 squares that separated from the electrode.

The results of the experiment are shown in the corresponding column of Table 1, "NUMBER OF SEPARATED SQUARES."

<Experiment 2>
Measuring Single Electrode Capacity

Each of electrodes S1 and E1–E5 was cut to become 30 mm×30 mm in size. The 30 mm×30 mm electrode was then sandwiched by sintered nickel electrodes with enough capacity for the capacity of the 30 mm×30 mm electrode via separators in between. Each pair of the electrodes were then put into a container for measuring the single electrode capacity, together with 30% by weight of potassium hydroxide solution. The container was then sealed. The internal pressure of the container was adjusted using nitrogen gas until it becomes 5 kgf/cm$^2$.

The single electrode capacity per 1 g of hydrogen absorbing alloy powder was measured for each electrode. The results of the experiment are shown in the corresponding column of Table 1, "SINGLE ELECTRODE CAPACITY."Each value in the SINGLE ELECTRODE CAPACITY column represents a percentage, where the value of electrode S1 represents 100% as the standard value.

Consideration of the Results of Experiments 1 and 2

As shown in the NUMBER OF SEPARATED SQUARES column in Table 1, electrode S1 of Sample 1 and electrode E1 of Comparative Sample 1 have a small number of separated squares. That means they have high electrode solidity (binding strength of active material).

In contrast, electrodes E2–E5 comparative Samples 2–5 have a large number of separated squares. That means they have low electrode solidity. In particular, the active materials of electrode E4 all separated from the core plate, and a number of active materials of electrode E5 separated from the core plate with a little stress since the electrode plate was not flexible.

As shown in the SINGLE ELECTRODE CAPACITY column of Table 1, the capacity of electrode S1 is a little smaller than that of non-sintered electrode E1, but is larger than those of electrodes E2–E5 of Comparative Samples 2–5.

The capacity of electrode E2 is small. The reason for this is thought as follows: a hydroxide was formed on the surface of the hydrogen absorbing alloy powder since the powder was given an alkali treatment, the hydroxide decomposed when the alloy was baked for sintering, and an oxide was formed on the surface of the alloy.

The capacity of electrode E5 is small. It is thought that this is because a segregation occurred to a part of the alloy due to the high baking temperature.

The single electrode capacity of electrode E4 could not be measured since a cell for the measurement could not be made because the hydrogen absorbing alloy powder did not fuse when it was baked for sintering and almost all the powder separated from the core plate.

It is found that electrodes S1 and E3 have almost the same single electrode capacity, though the electrode solidity of electrode E3 is much lower than that of electrode S1.

<Experiment 3>
Measuring Discharge Characteristics in High-Rate Discharge and in Low Temperature Cell A1 of Sample 1 and Cell X1 of Comparative Sample 1 were first charged with 100 mA at room temperature for 16 hours. After a one-hour pause, they were discharged with 200 mA until the cell voltage became 1.0V. They were then laid for one hour for a pause. The above charge/discharge cycle was repeated three times for activation. After this, the discharge characteristics in high-rate discharge and in low temperature were measured, as shown below.

(1) Discharge Characteristics in High-Rate Discharge

Cell A1 and Cell X1 were charged with 100 mA at room temperature for 16 hours. After a one-hour pause, they were discharged with 4000 mA until the cell voltage became 1.0V. The discharge capacity was then measured.

(2) Discharge Characteristics in Low Temperature

Cell A1 and Cell X1 were charged with 100 mA at room temperature for 16 hours. After a three-hour pause at −10° C., they were discharged with 1000 mA at −10° C. until the cell voltage became 1.0V. The discharge capacity was then measured.

The measurement results are shown in Table 2.

Consideration

As shown in in Table 2, cell A1 of sample 1 shows higher discharge characteristics both in high-rate discharge and in low temperature than cell X1 of Comparative Sample 1.

The reason for the above results is thought as follows: a non-sintered electrode plate such as electrode E1 includes a binding agent which is an insulation; sintered electrode S1 does not include a binding agent because it has been sintered; and sintered electrode S1 has higher electronic conductivity than electrode E1 since the contact resistance between the alloy powders is low because the alloy powders were sintered via metal Ni which has high conductivity.

<Experiment 4>
Charge/Discharge Cycle Test

A charge/discharge cycle test was performed on cell A1 of Sample 1 and cells X1–X3 of Comparative Samples 1–3 in the following conditions.

Cell A1 and Cells X1–X3 were first charged with 100 mA at room temperature for 16 hours. After a one-hour pause, they were discharged with 200 mA until the cell voltage became 1.0V. They were then laid for one hour for a pause. The above charge/discharge cycle was repeated three times for activation.

Cell A1 and Cells X1–X3 were then charged with 1000 mA at room temperature for 66 minutes. After a one-hour pause, they were discharged with 1000 mA until the cell voltage became 1.0V. They were then laid for one hour for a pause. The above charge/discharge cycle was repeated and the change in the discharge capacity was measured for each cycle.

Figure 2:
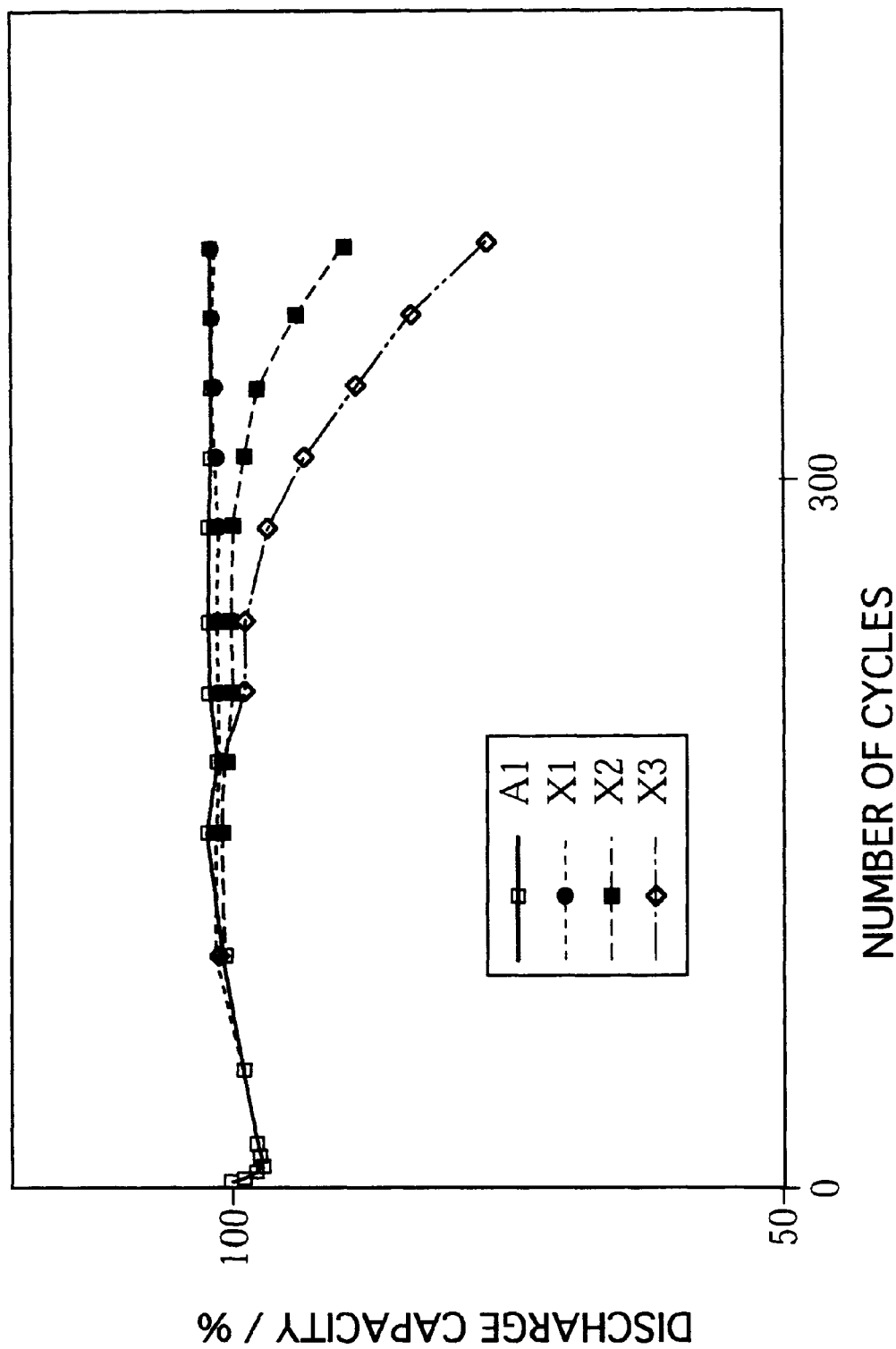
FIG.2 shows charge/discharge cycle characteristics representing a measurement result.

FIG.2 shows the measurement results, showing the change in the discharge capacity for each charge/discharge cycle.

Consideration

As shown in FIG.2, cell A1 and cell X2 show almost the same cycle characteristics, and cell A1 and cell X1 show higher cycle characteristics than cell X2 and cell X3.

The reason for the high cycle characteristics in cells A1 and X1 is thought as follows: a nickel-rich layer was formed on the surface of the hydrogen absorbing alloy through an acid treatment; and the nickel-rich layer worked as a protective layer and protected the hydrogen absorbing alloy from corrosion in the charge/discharge cycles.

The reason for the low cycle characteristics in cell X2 is thought as follows: a nickel-rich layer was formed on the surface of the hydrogen absorbing alloy through an alkali treatment, but at the same time, a hydroxide was also formed on the same surface; the hydroxide decomposed when the alloy was baked for sintering; the decomposition oxidized the surface of the alloy; and the corrosion of the hydrogen absorbing alloy grew as the cycle proceeded.

The reason for the low cycle characteristics in cell X3 is thought as follows: a nickel-rich layer was not formed on the surface of the hydrogen absorbing alloy; and the corrosion of the hydrogen absorbing alloy remarkably grew as the cycle proceeded.

<Embodiment 2>

The construction and production method of the metal hydride storage cell of Embodiment 2 are the same as Embodiment 1 except that a different method is used for forming a nickel-rich layer on the surface of the hydrogen absorbing alloy.

In the present Embodiment, the hydrogen absorbing alloy powder is produced in the same way as Embodiment 1. In the present Embodiment, however, an Ni layer is formed on the surface of the hydrogen absorbing alloy powder with the electroless deposition method.

A slurry is made by mixing hydrogen absorbing alloy powder with an Ni powder, an organic binding agent, and a solvent. The slurry is applied onto a metal holed core plate to produce a non-sintered hydrogen absorbing alloy electrode. A sintered hydrogen absorbing alloy electrode is generated by baking the non-sintered hydrogen absorbing alloy electrode for sintering.

The metal hydride storage cell including the above sintered hydrogen absorbing alloy electrode has the same effect as the cell of Embodiment 1 since the Ni layer is formed on the surface of the hydrogen absorbing alloy negative electrode and a steadily conductive network by Ni is formed in the electrode plate.

<Sample 2>

A sample hydrogen absorbing alloy electrode and a sample metal hydride storage cell were produced based on Embodiment 2.

An ingot of hydrogen absorbing alloy represented by composition formula $Mm_{1.0}Ni_{3.4}Co_{0.8}Mn_{0.6}Al_{0.2}$, which is the same ingot as that in Embodiment 1, was produced.

The ingot of hydrogen absorbing alloy was annealed for 8 hours at 1000° C. The ingot was then ground by a grinding machine until the mean grain size became 80 $\mu$m. Grains with grain size 10 $\mu$m or less were removed from the powder. The hydrogen absorbing alloy powder is called hydrogen absorbing alloy powder p.

An Ni layer was formed on the surface of the hydrogen absorbing alloy powder p with the electroless deposition method so that the ratio of the Ni layer to the hydrogen absorbing alloy powder p is 5:90 (parts by weight).

A slurry was made by mixing the above 90 parts by weight of hydrogen absorbing alloy powder with the 5 parts by weight of Ni layer with 5 parts by weight of Ni powder and 40 parts by weight of solution containing 2.5% by weight of poly ethylene oxide. The viscosity of the slurry was adjusted by water. The slurry was applied onto the punching metal.

The electrode was baked at 700° C. for three hours for sintering.

The sintered hydrogen absorbing alloy electrode produced as above is called electrode E2.

An SC-size electrode was made from the electrode S2, and was used as the negative electrode. A sintered nickel electrode was used as the positive electrode. An unwoven cloth made of polypropylene was used as the separator. A potassium hydroxide solution whose specific gravity is 1.30 at 25° C. was used as the alkali electrolyte. With such a construction, a metal hydride storage cell with nominal capacity 2400 mAh was produced. The ratio of the capacity of the positive electrode to that of the negative electrode was set to "1: about 1.6." The metal hydride storage cell produced as above is called cell A2.

<Comparative Sample 6>

A non-sintered hydrogen absorbing alloy electrode and a metal hydride storage cell were produced with the same production method as Sample 2 except that the Ni layer was not formed on the surface of the hydrogen absorbing alloy.

A slurry was made by mixing the 90 parts by weight of hydrogen absorbing alloy powder p of Sample 2 with 5 parts by weight of Ni powder and 40 parts by weight of a solution containing 2.5% by weight of poly ethylene oxide. The viscosity of the slurry was adjusted by water. The slurry was applied onto the punching metal. The electrode was baked for sintering in the same way as Sample 2. The sintered hydrogen absorbing alloy electrode produced as above is called electrode E6.

A metal hydride storage cell X6 was produced using the electrode in the same way as Samples <Comparative Sample 7>

A metal hydride storage cell was produced with the same production method as Sample 2 except the following: an Ni powder was not added to the hydrogen absorbing alloy, and a binding agent was added after the hydrogen absorbing alloy electrode was sintered.

A slurry was made by mixing 90 parts by weight of hydrogen absorbing alloy powder p with 5 parts by weight of Ni powder, which was made with the electroless deposition method, With 40 parts by weight of a solution containing 2.5% by weight of poly ethylene oxide. The viscosity of the slurry was adjusted by water. The slurry was applied onto the punching metal. The electrode was baked for sintering in the same way as Sample 2. The binding agent was added again to prevent the separation of the alloy. The sintered hydrogen absorbing alloy electrode produced as above is called electrode E7.

A metal hydride storage cell X7 was produced using the electrode E7 in the same way as Sample 2.

<Embodiment 3>

The construction and production method of the metal hydride storage cell of Embodiment 3 are the same as Embodiment 1 except that a different method is used for forming a nickel-rich layer on the surface of the hydrogen absorbing alloy powder.

In the present Embodiment, the hydrogen absorbing alloy powder is produced in the same way as Embodiment 1. In the present Embodiment, however, an Ni layer is formed on the surface of the hydrogen absorbing alloy powder by giving a mechanical energy.

A slurry is made by mixing the hydrogen absorbing alloy powder with the Ni powder formed on its surface with an Ni powder used as a metal which does not absorb hydrogen, also with an organic binding agent and a solvent. The slurry is applied onto a metal holed core plate to produce a non-sintered hydrogen absorbing alloy electrode. A sintered hydrogen absorbing alloy electrode is generated by baking the non-sintered hydrogen absorbing alloy electrode for sintering.

The metal hydride storage cell including the above sintered hydrogen absorbing alloy electrode has the same effect as the cell of Embodiment 1 since the Ni layer is formed on the surface of the hydrogen absorbing alloy of the negative electrode and a steadily conductive network by Ni is formed in the electrode plate.

<Sample 3>

A sample hydrogen absorbing alloy electrode and a sample metal hydride storage cell were produced based on Embodiment 3.

An Ni powder with mean grain size 1 m was mixed with the hydrogen absorbing alloy powder p of Sample 2 so that the ratio of the Ni powder to the hydrogen absorbing alloy powder p is 10:90 (parts by weight).

The mixed powder of the hydrogen absorbing alloy powder p and the Ni powder was given a mechanical energy using the Mechano-Fusion apparatus made by Hosokawa Micron so that the Ni powder was attached to the surface of the hydrogen absorbing alloy.

Figure 3:
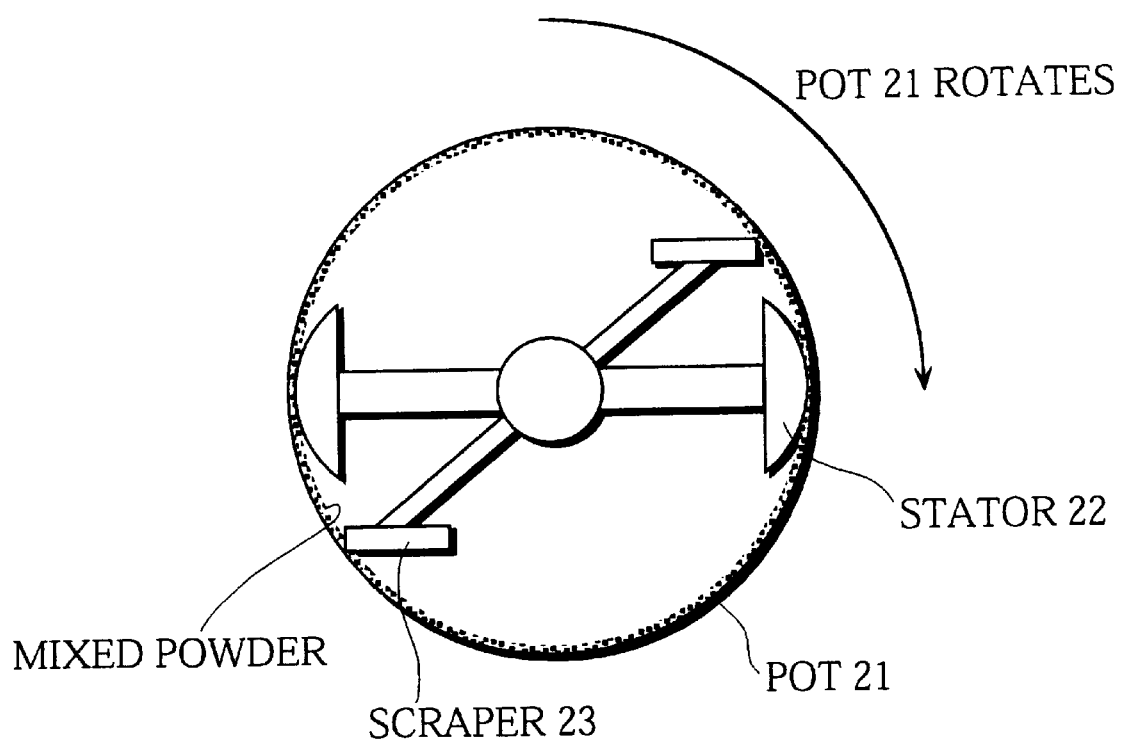
FIG.3 is a top view of the Mechano-Fusion apparatus used in Sample 3.

FIG.3 is a top view of the Mechano-Fusion apparatus.

The Mechano-Fusion apparatus is composed of pot 21, stator 22, and scraper 23. Pot 21, made of metal, spins as shown in the drawing. Stator 22 is fixed inside the pot 21 with a little distance between itself and pot 21. Scraper 23 is formed inside the pot 21.

The above mixed powder of the hydrogen absorbing alloy powder p and the Ni powder was put into pot 21 whose opening was then closed with the cover. Pot 21 was evacuated and rotated for 20 minutes at a rate of 1000 rotations per minute. As pot 21 rotated, the mixed powder was pushed aside to the sidewall of pot 21 by centrifugal force, as shown in the drawing, and was compressed, sheared, and given shocks between stator 22 and the sidewall. The mixed powder at the sidewall was chipped off by scraper 23. With such an operation by the Mechano-Fusion apparatus, the Ni powder was attached to the surface of the hydrogen absorbing alloy.

A slurry was made by mixing 90 parts by weight of hydrogen absorbing alloy powder p with 10 parts by weight of Ni powder formed on the surface of itself with 5 parts by weight of Ni powder and 40 parts by weight of a solution containing 2.5% by weight of poly ethylene oxide. The viscosity of the slurry was adjusted by water. The slurry was applied onto the punching metal.

The electrode was baked for sintering in the same way as Sample 3. The sintered hydrogen absorbing alloy electrode produced as above is called electrode S3.

A metal hydride storage cell A3 was produced using the electrode S3 in the same way as Sample 2.

<Experiment>

The following experiments 5–7 were performed using the electrodes and cells in Samples 2 and 3 and Comparative Samples 6 and 7.

<Experiment 5>

Measuring X-Ray Diffraction Pattern

The X-ray diffraction pattern was measured on electrodes S2 and S3 of Samples 2 and 3 and electrodes E6 and E7 of Comparative Samples 6 and 7.

When the measurement results of electrode E6 were studied, peaks of impurities were observed at around $2\theta=29.4°$ and $2\theta=26.5°$, as well as peaks of an $LaNi_5$ hydrogen absorbing alloy and peaks of Ni. It is considered that these impurities are hydroxides of rare earth or oxides of rare earth. In contrast, such peaks of impurities were not observed in the measurement results of electrodes S2 and S3 and electrode E7.

<Experiment 6>

Discharge Characteristics Test

A discharge characteristics test was performed on cells A2 and A3 of Samples 2 and 3 and cells X6 and X7 of Comparative Samples 6 and 7 in the following conditions.

Each cell was first charged with 0.1 CA (240 mA) for 16 hours. Each cell was then discharged with each of 0.2 CA (480 mA), 1 CA (2400 mA), 2 CA (4800 mA), 4 CA (9600 mA), and 8 CA (19200 mA), then the discharge capacity was measured for each case.

Table 3 shows the measurement results.

As shown in Table 3, the discharge capacity of cells X6 and X7 of Comparative Samples 6 and 7 is remarkably low for the high-rate discharge with discharge current 4 CA or more, while cells A2 and A3 of Samples 2 and 3 keep the discharge capacity 90% or more of the nominal capacity in the same conditions. The difference was remarkable in particular when the discharge current was 8 CA, when cell X7 did not discharge at all.

Figure 4:
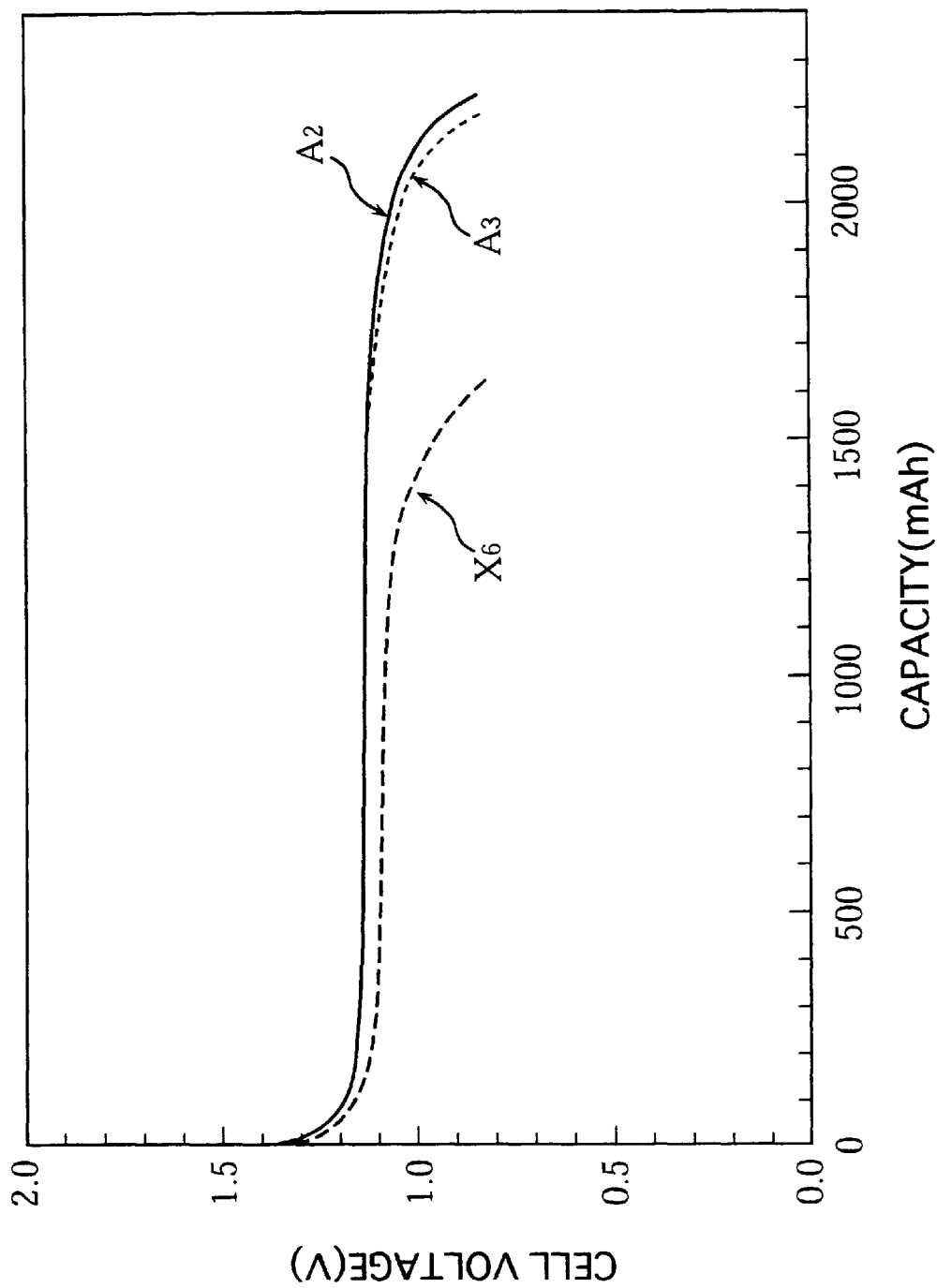
FIG.4 shows discharge characteristics of cells A2, A3, and X6 which are the results of Experiment 6.

FIG.4 shows the discharge characteristics of cells A2, A3, and X6 in the case with discharge current 8 CA. Note that the result of cell X7 is not shown in the drawing since this cell did not discharge.

As apparent from FIG.4, cells A2 and A3 have higher discharge voltage and discharge capacity than cell X6 and have discharge characteristics in high-rate discharge superior to those of cell X6.

The reason for the above results is thought as follows: the Ni layer formed on the hydrogen absorbing alloy in cells A2 and A3 suppressed the carbonization of the hydrogen absorbing alloy when the alloy was baked for sintering, and as a result, materials, such as hydroxides of rare earth or oxides of rare earth, which disturb cell reaction, were not generated.

<Experiment 7>

Charge/Discharge Cycle Test

A charge/discharge cycle test was performed on cells A2 and A3 of Samples 2 and 3 and cells X6 and X7 of Comparative Samples 6 and 7 in the following conditions.

Each cell was first charged with current 1 CA using a charger which can stop charging at $-\Delta V=10$ mV. After the charge of a cell stopped at $-\Delta V=10$ mV, the cell was laid for one hour for a pause. Each cell was then discharged with current 1 CA until the discharge end voltage became 1V. Each cell was then laid for one hour for a pause. The above charge/discharge cycle was repeated and the change in the discharge capacity and the internal resistance was measured for each cycle.

Figure 5:
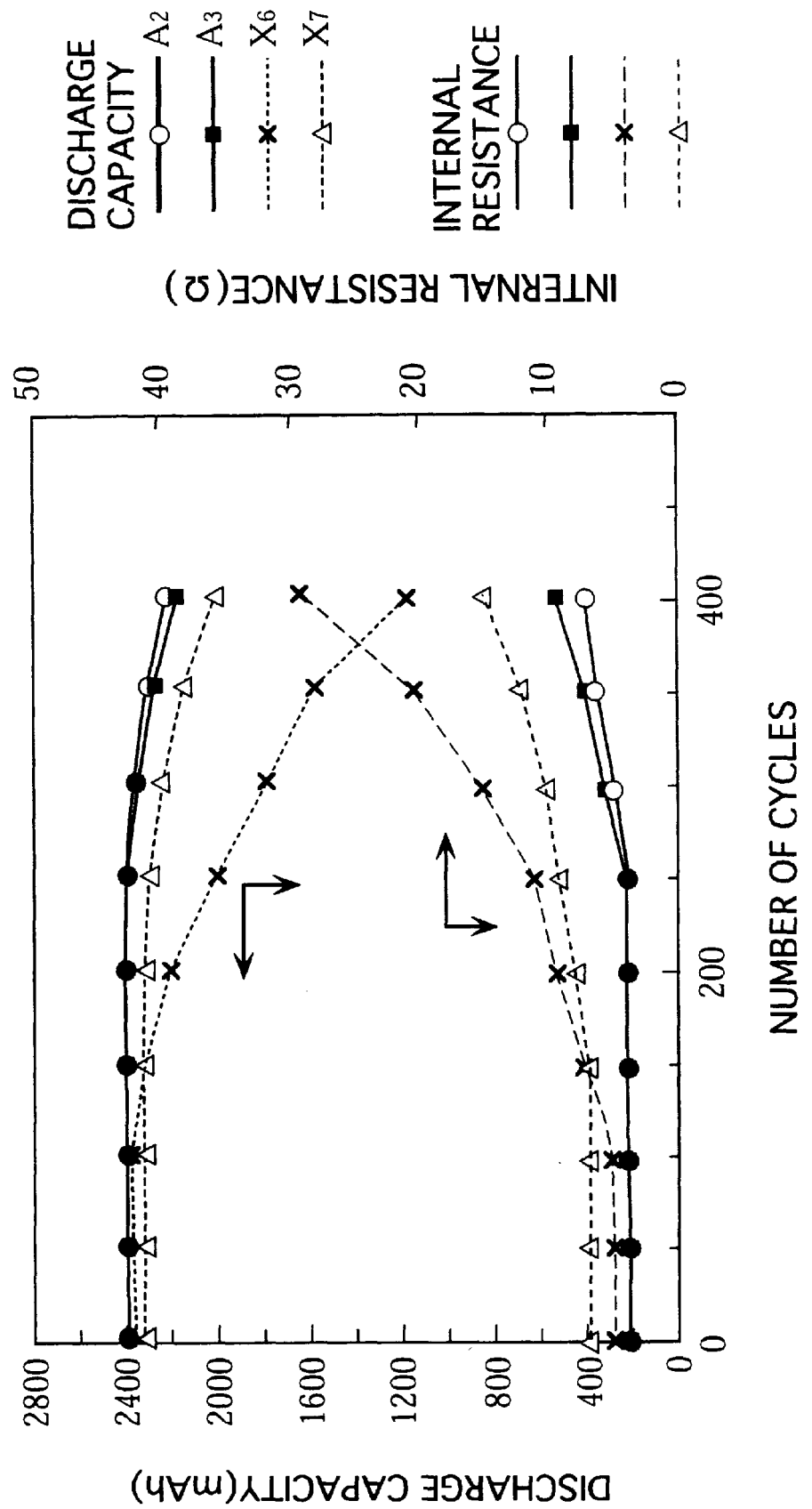
FIG.5 shows charge/discharge cycle characteristics representing the results of Experiment 7.

As shown in FIG.5, in cell X6, the discharge capacity starts decreasing and the internal resistance starts increasing at around the 150th cycle. In contrast, in cells A2 and A3, increase in the internal resistance is not remarkable and 90% or more of the initial discharge capacity is maintained even at the 400th cycle.

As Experiment 6, the reason are the above results is thought as follows: the Ni layer formed on the hydrogen absorbing alloy in cells A2 and A3 suppressed the carbonization of the hydrogen absorbing alloy when the alloy was baked for sintering, and as a result, materials which disturb cell reaction were not generated.

It is also found by studying FIG.5 that the internal resistance of cell X7 is high from the beginning of the cycle test and that the cycle life of cell X7 is shorter than that of cells A2 and A3.

The reason for the above results is thought as follows: the conductivity of the electrode reduced due to the binding agent which was added after the electrode was baked for sintering.

<Others>

In the above Samples, metal Ni powder was added as a metal which does not absorb hydrogen. It is possible to obtain the same effect by using a metal Co powder or an alloy powder containing Ni or Co instead of the metal Ni powder.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed a being included therein.

What is claim is:

1. A method of producing a hydrogen absorbing alloy electrode, the method comprising;

a first step of generating a first powder by giving a surface treatment to a hydrogen absorbing alloy powder in an acid solution so as to form a nickel-rich layer on a surface of the hydrogen absorbing alloy powder;

a second step of generating a mixed material by mixing the first powder with a second powder which is composed of at least one of a metal Ni, a metal Co, an alloy containing Ni, and an alloy containing Co;

a third step of attaching the mixed material to a base plate; and a fourth step of baking the base plate for sintering the mixed material attached to the base plate.

2. The method of producing the hydrogen absorbing alloy electrode as defined in claim 1, wherein in the second step, a slurry is generated by mixing the first powder, the second powder, and an organic binding agent, and wherein in the third step, the slurry is attached to the base plate by applying the slurry onto the base plate.

3. The method of producing the hydrogen absorbing alloy electrode as defined in claim 1, wherein the hydrogen absorbing alloy powder includes Mischmetal.

4. A method of producing a hydrogen absorbing alloy electrode, the method comprising:

a first step of generating a first powder by attaching a nickel-rich metal to a surface of a hydrogen absorbing alloy powder;

a second step of generating a mixed material by mixing the first powder with a second powder which is composed of at least one of a metal Ni, a metal Co, an alloy containing Ni, and an alloy containing Co;

a third step of attaching the mixed material to a base plate; and a fourth step of baking the base plate for sintering the mixed material attached to the base plate.

5. The method of producing the hydrogen absorbing alloy electrode as defined in claim 4, wherein in the second step, a slurry is generated by mixing the first powder, the second powder, and an organic binding agent, and wherein in the third step, the slurry is attached to the base plate by applying the slurry onto the base plate.

6. The method of producing the hydrogen absorbing alloy electrode as defined in claim 4, wherein the hydrogen absorbing alloy powder includes Mischmetal.

7. The method of producing the hydrogen absorbing alloy electrode as defined in claim 4, wherein in the first step, the nickel-rich metal is attached to the surface of the hydrogen absorbing alloy powder by a metal plating method.

8. The method of producing the hydrogen absorbing alloy electrode as defined in claim 4, wherein in the first step, the nickel-rich metal is attached to the surface of the hydrogen absorbing alloy powder by giving a mechanical energy to a mixture of the hydrogen absorbing alloy powder and a powder of the nickel-rich metal.

* * * * *